(12) United States Patent
Brice

(10) Patent No.: US 6,896,301 B2
(45) Date of Patent: May 24, 2005

(54) CLAMP ASSEMBLY

(75) Inventor: Lawrence E. Brice, Armada, MI (US)

(73) Assignee: Master Pneumatic-Detroit, Inc., Sterling Heights, MI (US)

(*) Notice: Subject to any disclaimer, the term of this patent is extended or adjusted under 35 U.S.C. 154(b) by 0 days.

(21) Appl. No.: 10/706,588

(22) Filed: Nov. 12, 2003

(65) Prior Publication Data

US 2004/0094960 A1 May 20, 2004

Related U.S. Application Data

(60) Provisional application No. 60/425,380, filed on Nov. 12, 2002.

(51) Int. Cl.[7] .................................................. F16L 23/00
(52) U.S. Cl. ...................... 285/364; 285/366; 285/367; 285/406; 285/410
(58) Field of Search ................................ 285/364, 365, 285/366, 367, 406, 407, 408, 409, 410

(56) References Cited

U.S. PATENT DOCUMENTS

| | | | | |
|---|---|---|---|---|
| 2,956,818 A | * | 10/1960 | Dickerson et al. | 285/18 |
| 3,398,978 A | * | 8/1968 | Gasche | 285/187 |
| 3,602,532 A | * | 8/1971 | Ehrenberg | 285/364 |
| 4,079,970 A | * | 3/1978 | Brett | 285/136.1 |
| 4,289,335 A | | 9/1981 | Olbermann | |
| 4,438,960 A | * | 3/1984 | Carroll et al. | 285/367 |
| 5,372,392 A | | 12/1994 | Dunn et al. | |
| 5,443,581 A | * | 8/1995 | Malone | 285/364 |
| 6,003,548 A | * | 12/1999 | Muchow | 137/14.05 |
| 6,536,811 B1 | * | 3/2003 | Ranson et al. | 285/364 |
| 6,626,466 B1 | * | 9/2003 | Dole | 285/112 |
| 2003/0197381 A1 | * | 10/2003 | Lehnhardt | 285/364 |

FOREIGN PATENT DOCUMENTS

GB    2218350 A   * 11/1989   ........... B01D/33/06

\* cited by examiner

*Primary Examiner*—James M. Hewitt
(74) *Attorney, Agent, or Firm*—Gifford, Krass, Groh, Sprinkle, Anderson & Citkowski, P.C.

(57) ABSTRACT

A clamp assembly is provided for interconnecting components in a fluid system. The clamp assembly includes two interconnected clamp members each having a C-shape that form a channel, and a spacer disposed within the channel having a centrally located bore defining a part of a central passageway for the transmission of a fluid. The clamp assembly also includes at least one port member disposed in the clamp member channel adjacent the spacer having a center portion with a clamping portion at one end of the center portion and a connecting portion at the opposite end and a longitudinally extending bore defining part of a central passageway for the transmission of the fluid. The port member includes a flange extending radially from the port member clamping portion having a predetermined shape corresponding to that of the clamp member channel. A plurality of clamping forces from the clamp members are directed radially inwards from points of contact between the flange and the clamp members to provide cross loading.

27 Claims, 4 Drawing Sheets

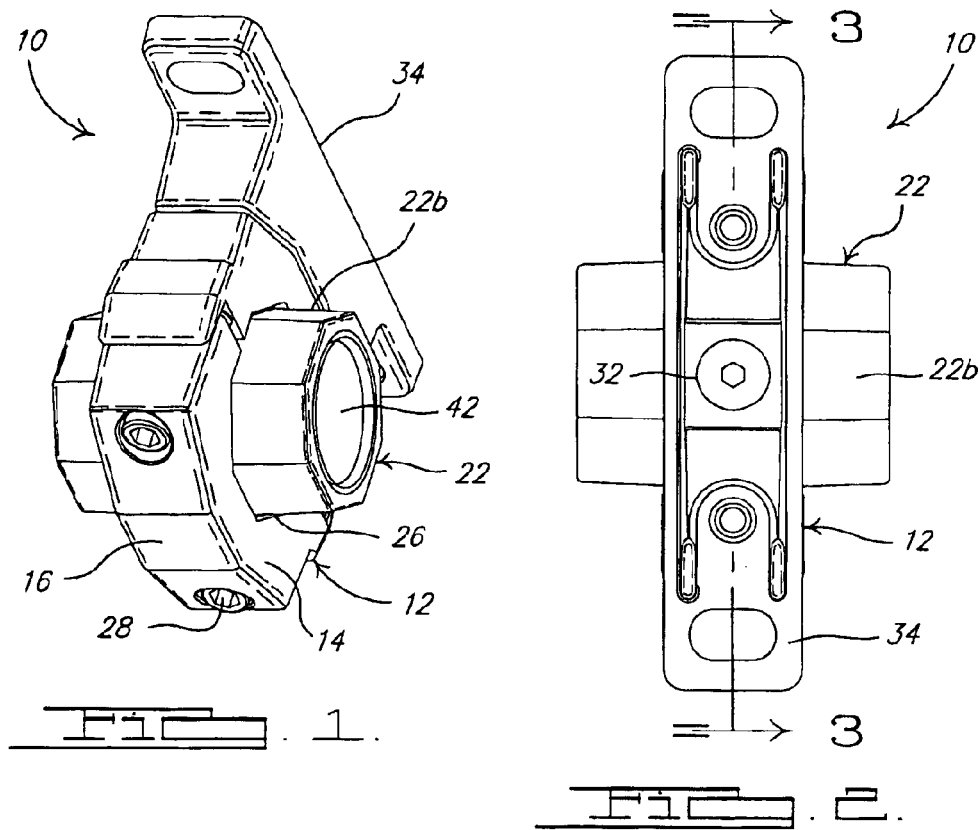
FIG. 1.
FIG. 2.
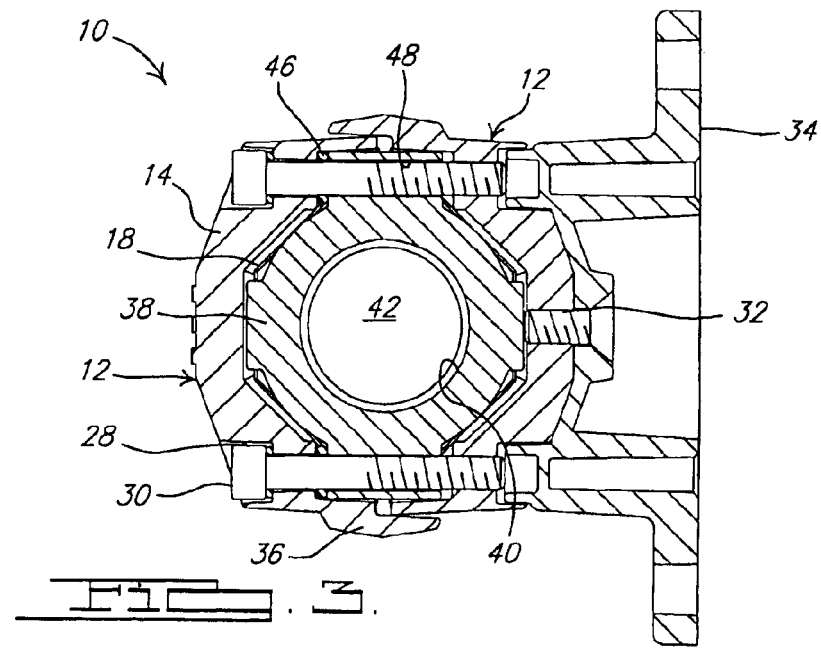
FIG. 3.

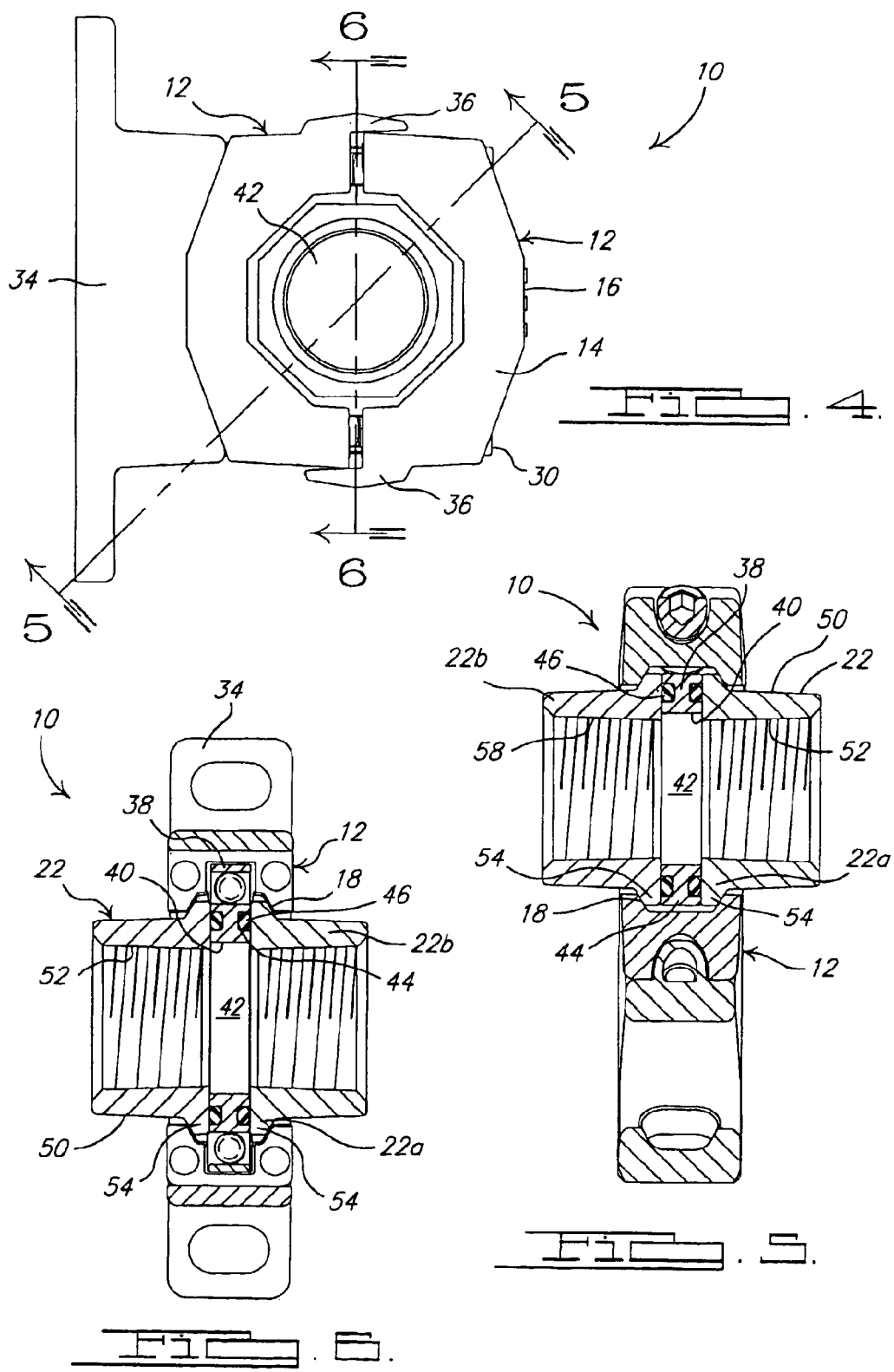

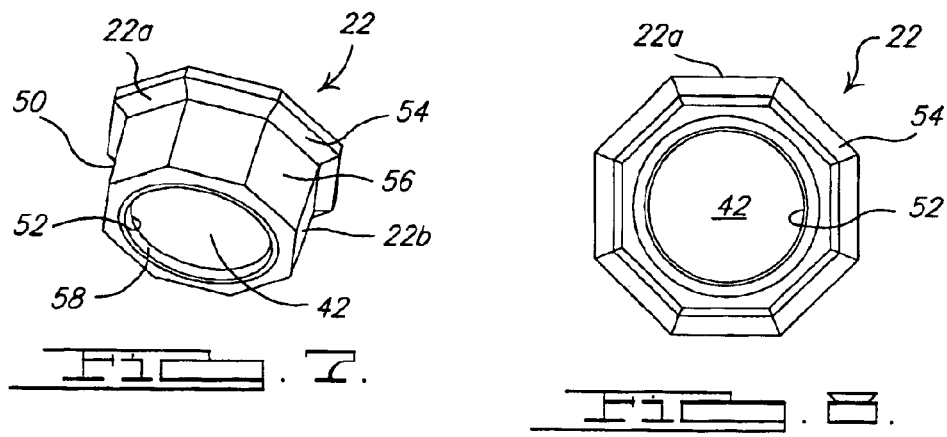
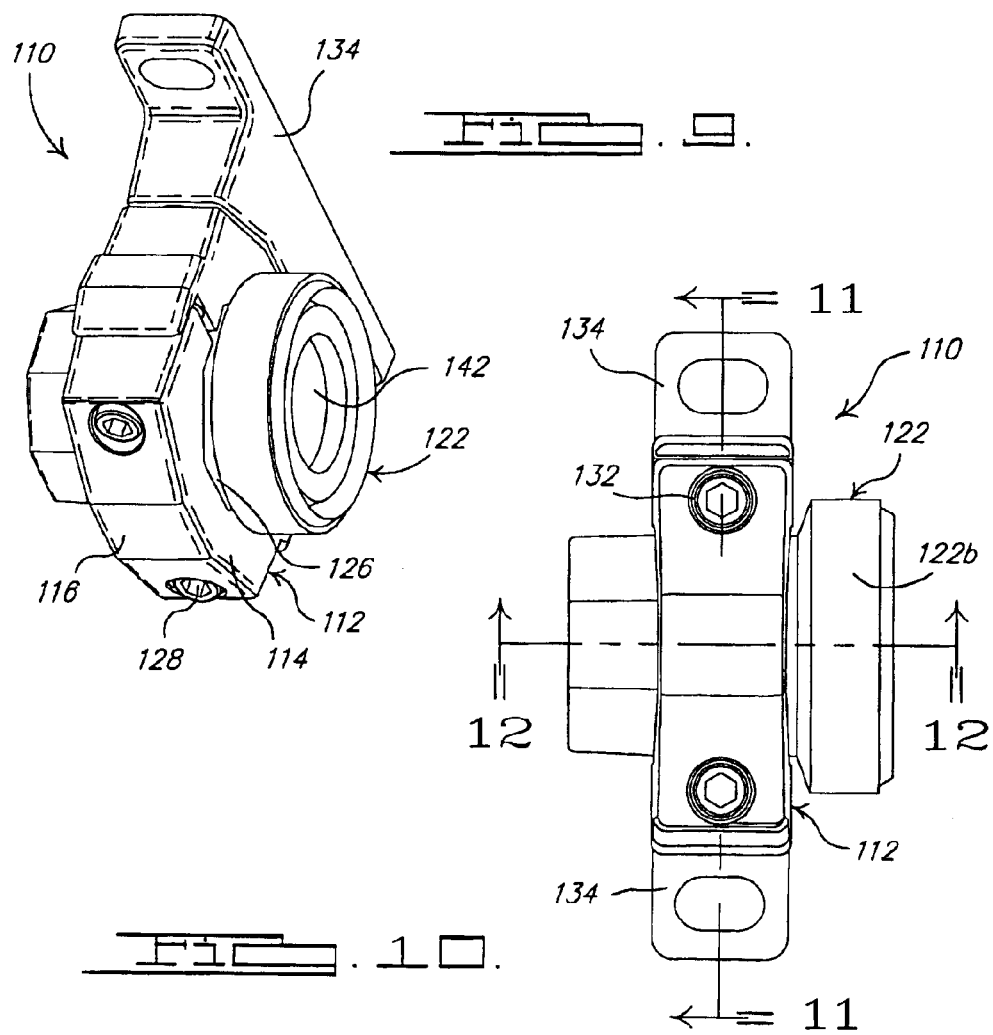

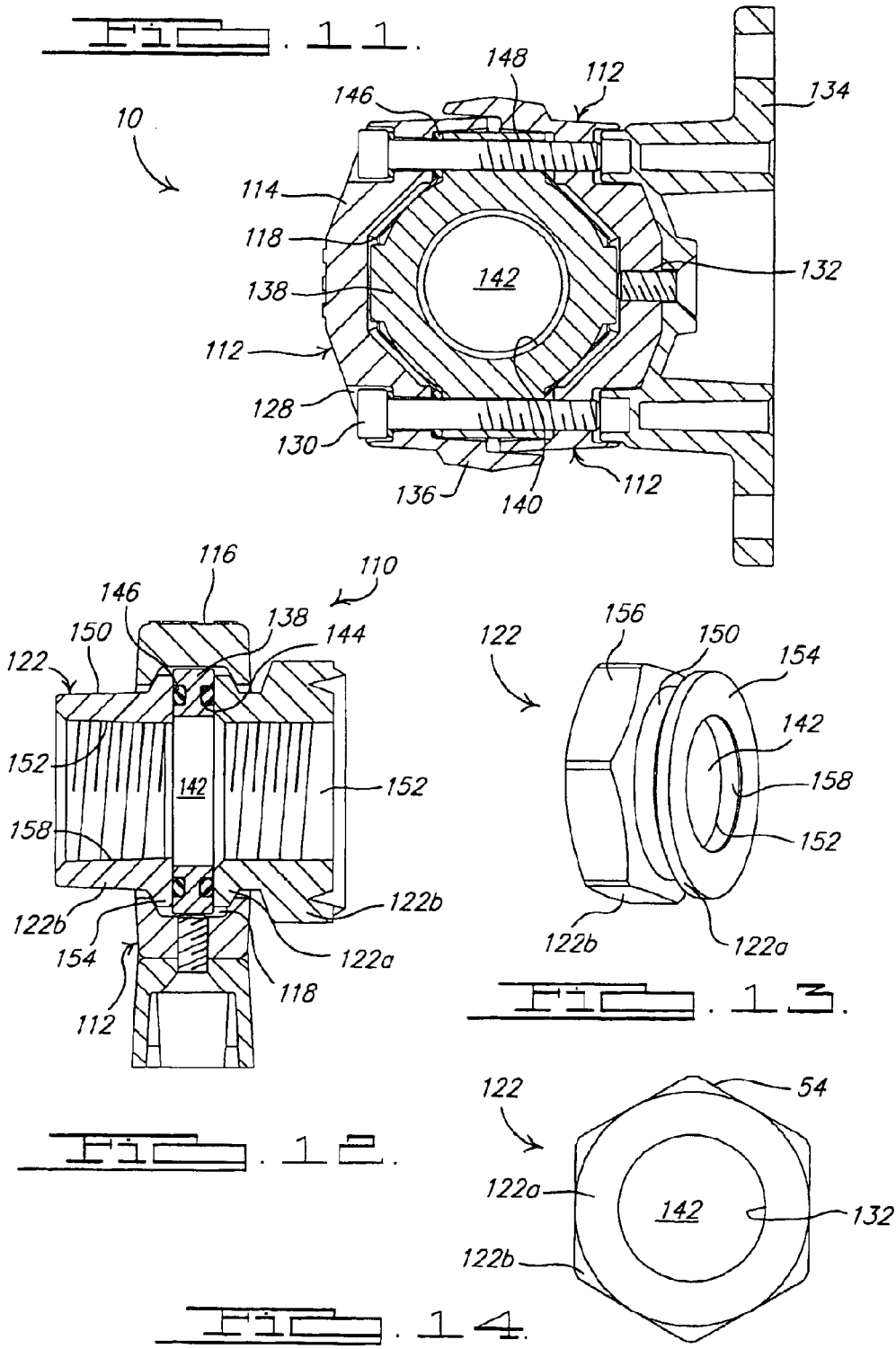

CLAMP ASSEMBLY

RELATED APPLICATION

This application claims priority of U.S. Provisional Patent Application Ser. No. 60/425,380 filed Nov. 12, 2002, which is incorporated herein by reference.

BACKGROUND OF THE INVENTION

1. Field of the Invention

The present invention relates generally to connectors and, more specifically, to a clamp assembly for use in a compressed air system.

2. Description of the Related Art

Fluid systems typically include one or more interconnected components that facilitate the transmission of a fluid, such as filters, regulators and lubricators, or the like. Clamp assemblies are well known in the art for connecting together these components within a particular system. One example of a fluid system is a compressed air system.

The clamp assembly generally includes two clamp members secured together using a fastening means. The assembly also includes a first port member and a second port member having a flange extending radially from a clamping end of the first port member or the second port member. In the past, the clamping flange had a non-symmetrical shape, such as rectangular, or did not extend all the way around the clamping end of the connecting port. While these clamp assemblies work under most circumstances, they can sometimes leak. Thus, there is a need in the art for a clamp assembly with improved alignment and improved force distribution across the clamping flange in order to provide a better seal within the fluid system.

SUMMARY OF THE INVENTION

Accordingly, the present invention is an improved clamp assembly. The clamp assembly includes two interconnected clamp members each having a C-shape that form a channel, and a spacer disposed within the channel having a centrally located bore defining a part of a central passageway for the transmission of a fluid. The clamp assembly also includes at least one port member disposed in the clamp member channel adjacent the spacer having a center portion with a clamping portion at one end of the center portion and a connecting portion at the opposite end and a longitudinally extending bore defining part of a central passageway for the transmission of the fluid. The port member includes a flange extending radially from the port member clamping portion having a predetermined shape corresponding to that of the clamp member channel. A plurality of clamping forces from the clamp members are directed radially inwards from points of contact between the flange and the clamp members to provide cross loading One advantage of the present invention is that an improved clamp assembly is provided for interconnecting together components in a fluid system. Another advantage of the present invention is that the clamping forces exerted on the connecting port flange are more uniformly distributed across the flange, thus reducing any leakage around the clamp. Still another advantage of the present invention is that the connecting port is more uniformly aligned within the clamp member to provide more uniformly distributed clamping forces. A further advantage of the present invention is that the component attached to the connecting port can be oriented in a plurality of directions as a result of the more evenly distributed clamping forces. Still a further advantage of the present invention is that the clamp assembly is easier to manufacture. Yet a further advantage of the present invention is that there is greater flexibility in the type of components that can be interconnected.

Other features and advantages of the present invention will be readily appreciated, as the same become better understood after reading the subsequent description taken in conjunction with the accompanying drawings.

BRIEF DESCRIPTION OF THE DRAWINGS

FIG. 1 is a perspective view of a clamp assembly, according to the present invention.

FIG. 2 is an end elevational view of the clamp assembly of FIG. 1, according to the present invention.

FIG. 3 is a sectional view taken along line 3—3 of FIG. 2, according to the present invention.

FIG. 4 is a side elevational view of the clamp assembly of FIG. 1, according to the present invention.

FIG. 5 is a sectional view of the clamp assembly of FIG. 4, taken along line 5—5, according to the present invention.

FIG. 6 is a sectional view of the clamp assembly of FIG. 4, taken along line 6—6, according to the present invention.

FIG. 7 is a perspective view of the port member for the clamp assembly of FIG. 1, according to the present invention.

FIG. 8 is an end view of the port member of FIG. 7, according to the present invention.

FIG. 9 is a perspective view of an alternative embodiment of a clamp assembly with a circular-shaped port, according to the present invention.

FIG. 10 is an end elevational view of the clamp assembly of FIG. 9, according to the present invention.

FIG. 11 is a sectional view of the clamp assembly of FIG. 10, taken along line 11—11, according to the present invention.

FIG. 12 is a sectional view of the clamp assembly of FIG. 10, taken along line 12—12, according to the present invention.

FIG. 13 is a perspective view of the port member for the clamp assembly of FIG. 9, according to the present invention.

FIG. 14 is an end view of the port member of FIG. 13, according to the present invention.

DESCRIPTION OF THE PREFERRED EMBODIMENT(S)

Referring to FIGS. 1–8, one embodiment of a clamp assembly 10 is illustrated. The clamp assembly 10 is removably attached to a mounting bracket using a fastener, in a manner to be described. The clamp assembly 10 is utilized to interconnect components (not shown) in a fluid system. In this example the fluid system is a compressed air system, although other types of fluid systems are contemplated. An example of a fluid system component is a filter, or regulator or lubricator or the like.

The clamp assembly 10 includes two opposed clamp members 12 secured together to form an integral clamp member. Each clamp member 12 generally has a C-shape, with two sidewalls 14 each connected at an inner end to an outer wall 16. The inner portion of the sidewalls 14 and outer wall 16 cooperatively form a channel 18 for receiving a spacer 38 and a port member 22. Each clamp member 12 is symmetrical, such that when joined, the two clamp members 12 form a unitary clamping member. The sidewall 14 and outer wall 16 each have a predetermined geometric shape to define an opening shown at 26 corresponding to the shape of a flange portion 54 of the port member 22. In this example, the shape is an octagon. This opening 26, with its predetermined shape, is part of a central passageway 42 for the fluid. In addition, each outer wall 16 has a predetermined shape, so that when interconnected, the clamp assembly 10 has a predetermined shape, which in this example is generally octagonal. Other shapes are also considered, such as a hexagon or a pentagon.

The clamp member 12 may include other features. For example, each clamp member 12 may include a bore 28 extending longitudinally therethrough to provide a passageway for a fastener 30 used in retaining the clamp members 12 together. It should be appreciated that at least one of the clamp members 12 may also include an aperture 32 for securing the clamp assembly 10 to a bracket 34. It should also be appreciated that each of the clamp members 12 may include an overlapping portion 36 extending outwardly from one end of the outer wall 16, beyond the sidewall 14. The overlapping portion 36 assists in orientating the clamp members 12 when putting the clamp assembly 10 together. The clamp member is preferably made from a metal material, such as steel or aluminum, or zinc.

The clamp assembly 10 also includes a spacer 38 that is disposed in the channel 18 formed by the sidewalls 14 and outer wall 16 of the clamp members 12. The spacer 38 is a generally circular member, with a centrally located bore as shown at 40. The spacer 38 corresponds in size to the central fluid passageway 42 extending longitudinally therethrough the interconnected clamp members 12. The spacer 38 corresponds in shape to the shape of the channel 18 formed by the interconnected clamp members 12. A face of the spacer 38 also includes an annular groove 44 for receiving a seal 46, such as an O-ring. Preferably, the spacer 38 is made from materials such as plastic, zinc, aluminum or rubber. The spacer 38 may include a longitudinally extending bore shown at 48 aligned with the bore 28 in the clamp member 12, for receiving the fastener 30 therethrough in securing the clamp members 12 together.

The clamp assembly 10 further includes at least one, and preferably two port members 22, as shown in FIGS. 7 and 8. It should be appreciated that the port member 22 may be an inlet port or an outlet port used in interconnecting components within the fluid system. The port member 22 includes a center portion 50 with a longitudinally extending bore 52 forming part of the central fluid passageway 42. A clamping end 22a of the port member center portion 50 includes a radially extending flange 54. The flange 54 has a predetermined shape, which in this example is octagonal.

An outer wall 56 of the connecting end 22b of the port member 22 also has a predetermined shape, which in this example is octagonal, although other shapes are contemplated. The components in the fluid system connect to the connecting end 22b of the port member 22. The shape corresponds to the shape of the channel 18 formed by the interconnected clamp members 12. An inner wall 58 of the port member 22 forming the central fluid passageway 42 is circular. It should be appreciated that the inner wall 58 may be threaded.

In operation, the spacer 38 is positioned in the channel 18 formed in one of the clamp members 12. A port member 22 is also positioned in channel 18 formed in one of the clamp members 22, adjacent the face of the spacer 38, such that the connecting portion 22b of the port member 22 extends beyond the clamping member 12. It should be appreciated that in this example, there is a port member 22 positioned adjacent each face of the spacer 38, so that the spacer 38 is sandwiched between each port member 22. The other clamp member 12 is positioned over the spacer 38 and clamp members 22. The longitudinally extending bore 28 in the clamp members 12 and spacer 38 are in alignment. A fastener 30, such as a bolt, is disposed in the bore and tightened, to secure the clamp members 12 together. It should be appreciated that the overlapping portion 36 of each clamp member 12 opposes each other.

Advantageously, a plurality of clamping forces from the clamp members 12 are exerted on the flange portion 54 of the port members 22, to rigidly retain the port members 22 between the interconnected clamp members 12. The clamping forces are directed radially inwards from the contact points between the clamp member 12 and the flange 54 towards the center of the central fluid passageway 42 to provide cross-loading. It should be appreciated that the predetermined shape of the opening in the interconnected clamp member 12, and corresponding shape of the port member 22 and flange 54 is octagonal. An octagon is advantageous since the forces are more uniformly distributed around the central fluid passageway 42. Also, there is a greater surface area for contact between the flange 54 and the clamp member 12. Further, the orientation of the clamp assembly 10 with respect to the connecting component is more flexible. This is advantageous, since the port can be customized to fit a variety of connecting components. Other planar geometric shapes, such as a pentagon, hexagon, or heptagon may also be considered.

In an alternative embodiment illustrated in FIGS. 9–14, the port member 122 includes a clamping end 122a with a round flange 154. Like features to the embodiment previously described with respect to FIGS. 1–8 have like reference numbers increased by 100. It should be appreciated that connecting end 122b of the port member 122 may have a circular shape as shown in FIGS. 9 and 10. Alternatively, the connecting end 122b may be a different shape than that of the flange 154, as shown in FIGS. 13 and 14.

The round flange shape advantageously provides for cross-loading of the forces across the face of the flange 154 at the points of contact between the flange 154 and the clamp member 122. The function of each of the components in the clamp assembly 110 is similar to the embodiment described with respect to FIGS. 1–8.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A clamp assembly for interconnecting components in a fluid system comprising:

two interconnected clamp members that form a channel, wherein each clamp member includes two sidewalls and an outer wall disposed between said sidewalls to cooperatively form said clamp member channel having a generally octagonal shape;

a fastener disposed in a longitudinally extending bore for interconnecting said clamp members;

a spacer disposed within said channel, wherein said spacer includes a centrally located bore defining a part of a central passageway for the transmission of a fluid and a transversely extending bore for receiving the fastener for retaining the clamp members together;

two opposed port members disposed in said clamp member channel with said spacer therebetween, wherein each port member includes a center portion with a clamping portion at one end of said center portion and a connecting portion at the opposite end and a longitudinally extending bore defining part of the central passageway for the transmission of the fluid; and a flange extending radially from each port member clamping portion, wherein said flange has an octagonal shape corresponding to that of said clamp member channel, so that a plurality of clamping forces from said clamp members are directed radially inwards from points of contact between said flanges and said clamp members to provide cross loading.

2. A clamp assembly as set forth in claim 1 further comprising a mounting bracket for holding the clamp assembly.

3. A clamp assembly as set forth in claim 1 wherein a free edge of each sidewall has an octagonal shape to define an opening corresponding to the octagonal shape of each port member flange.

4. A clamp assembly as set forth in claim 1 wherein said spacer includes an annular groove for receiving a sealing means.

5. A clamp assembly as set forth in claim 4 wherein said sealing means is an O-ring.

6. A clamp assembly as set forth in claim 1 wherein one port member is an inlet port member and the other port member is an outlet port member.

7. A clamp assembly as set forth in claim 1 wherein each port member connecting portion has an octagonal shape for interconnecting the fluid system components.

8. A clamp assembly for interconnecting components in a fluid system comprising:
  two interconnected clamp members that form a channel, wherein each clamp member includes two sidewalls and an outer wall disposed between said sidewalls to cooperatively form said clamp member channel having a generally circular shape;
  a fastener disposed in a longitudinally extending bore for interconnecting said clamp members;
  a spacer disposed within said channel, wherein said spacer includes a centrally located bore defining a part of a central passageway for the transmission of a fluid and a transversely extending bore for receiving the fastener for retaining the clamp members together;
  two opposed port members disposed in said clamp member channel with said spacer therebetween, wherein each port member includes a center portion with a clamping portion at one end of said center portion and a connecting portion at the opposite end and a longitudinally extending bore defining part of the central passageway for the transmission of the fluid; and
  a flange extending radially from each port member clamping portion, wherein said flange has a circular shape corresponding to that of said clamp member channel, so that a plurality of clamping forces from said clamp members are directed radially inwards from points of contact between said flanges and said clamp members to provide cross loading.

9. A clamp assembly as set forth in claim 8 further comprising a mounting bracket for holding the clamp assembly.

10. A clamp assembly as set forth in claim 8 wherein a free edge of each sidewall has a circular shape to define an opening corresponding to the circular shape of each port member flange.

11. A clamp assembly as set forth in claim 8 wherein said spacer includes an annular groove for receiving a sealing means.

12. A clamp assembly as set forth in claim 11 wherein said sealing means is an O-ring.

13. A clamp assembly as set forth in claim 8 wherein one port member is an inlet port member and the other port member is an outlet port member.

14. A clamp assembly as set forth in claim 8 wherein each port member connecting portion has an octagonal shape for interconnecting the fluid system components.

15. A clamp assembly as set forth in claim 8 wherein each port member connecting portion has a circular shape for interconnecting the fluid system components.

16. A clamp assembly for interconnecting components in a fluid system comprising:
  two interconnected clamp members each having a C-shape that form a channel;
  a spacer disposed within said channel, wherein said spacer is generally circular and includes a centrally located bore defining a part of a central passageway for the transmission of a fluid, and a transversely extending bore for receiving a fastener for retaining the clamp members together;
  at least one port member disposed in said clamp member channel adjacent said spacer, wherein said port member includes a center portion with a clamping portion at one end of said center portion and a connecting portion at the opposite end and a longitudinally extending bore defining part of the central passageway for the transmission of the fluid; and
  a flange extending radially from said port member clamping portion, wherein said flange has a predetermined shape corresponding to that of said clamp member channel, so that a plurality of clamping forces from said clamp members are directed radially inwards from points of contact between said flange and said clamp members to provide cross loading.

17. A clamp assembly as set forth in claim 16 wherein each clamp member includes a longitudinally extending bore for receiving the fastener for interconnecting the clamp members.

18. A clamp assembly as set forth in claim 16 further comprising a mounting bracket for holding the clamp assembly.

19. A clamp assembly as set forth in claim 16 wherein each clamp member includes two sidewalls and an outer wall disposed between said sidewalls to cooperatively form said clamp member channel.

20. A clamp assembly as set forth in claim 19 wherein a free edge of each sidewall has a predetermined shape to define an opening corresponding to the predetermined shape of said port member flange.

21. A clamp assembly as set forth in claim 16 wherein said spacer includes an annular groove for receiving a sealing means.

22. A clamp assembly as set forth in claim 21 wherein said sealing means is an O-ring.

23. A clamp assembly as set forth in claim 16 further comprising two port members disposed in the clamp member channel, wherein one port member is an inlet port member and the other port member is an outlet port member.

24. A clamp assembly as set forth in claim 16 wherein said port member flange and said clamp member channel each have an octagonal shape.

25. A clamp assembly as set forth in claim 16 wherein said port member connecting portion has an octagonal shape for interconnecting the fluid system components.

26. A clamp assembly as set forth in claim 16 wherein said port member flange and said clamp member channel each have a circular shape.

27. A clamp assembly as set forth in claim 16 wherein said port member connecting portion has a circular shape for interconnecting the fluid system components.

* * * * *